C. H. BROWN.
CAR-AXLE BOX-WASHER.
No. 170,811. Patented Dec. 7, 1875.
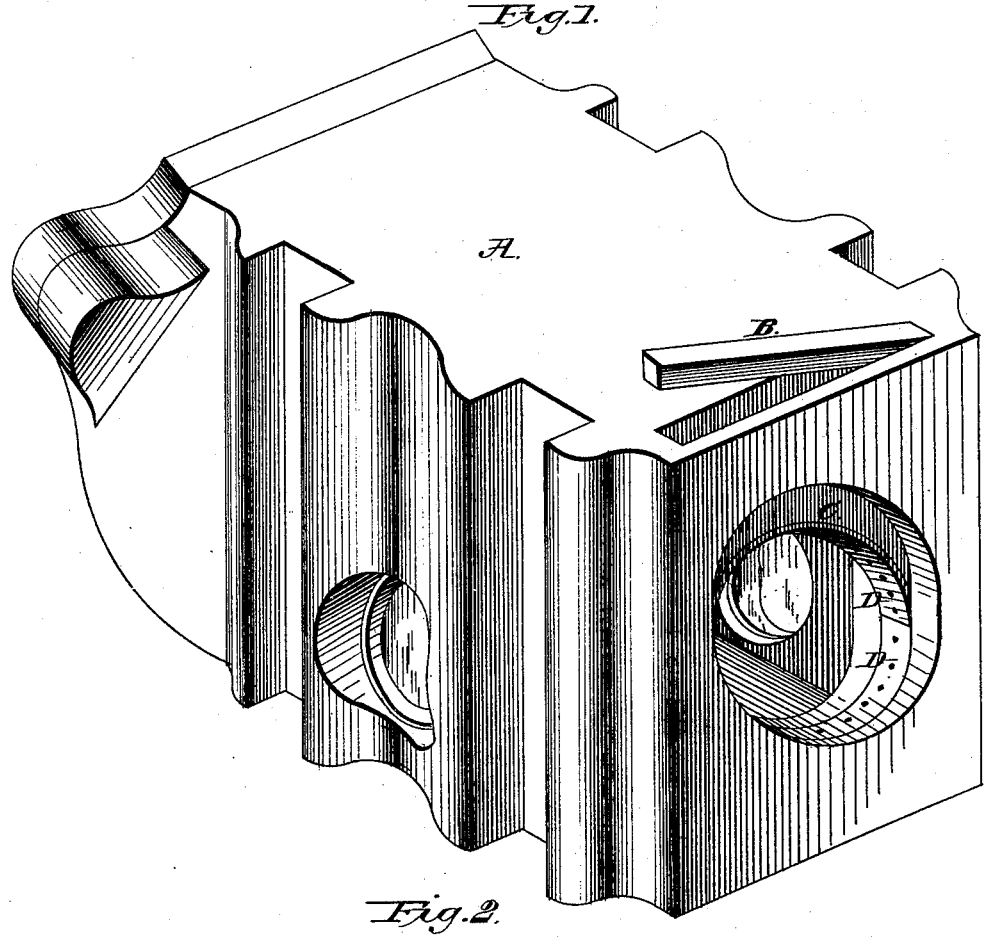
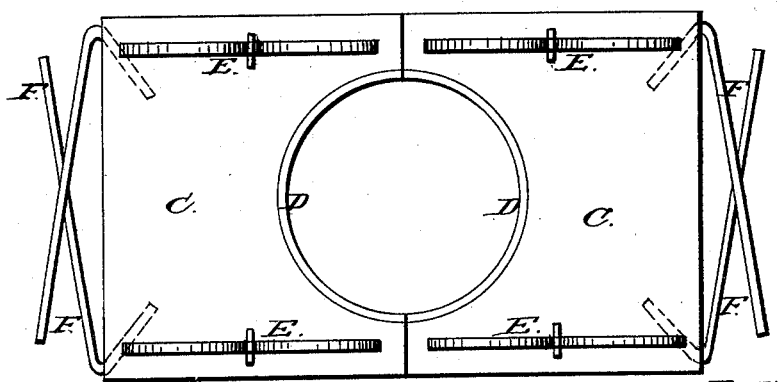
Witnesses:
Geo. T. Pickett
Geo. L. Westman
Inventor:
Chas. H. Brown.

UNITED STATES PATENT OFFICE.

CHARLES H. BROWN, OF RICHMOND, VIRGINIA.

IMPROVEMENT IN CAR-AXLE-BOX WASHERS.

Specification forming part of Letters Patent No. 170,811, dated December 7, 1875; application filed October 6, 1875.

*To all whom it may concern:*

Be it known that I, CHARLES H. BROWN, of the city of Richmond, State of Virginia, have invented an Automatic Severed or Bisected Backliner or Washer for Car-Axle Boxes, of which the following is a specification:

The object of my invention is to prevent the admission of dust or other foreign substance into the car-axle box; also, to prevent the escape of grease or lubricator from the box at the dust-chamber.

The backliner or washer is illustrated in detail in the accompanying drawing, C C. It consists of a divided or severed flat oblong piece of wood or leather, of such size as to fit with easy play in the dust-chamber of a car-box. In the center of said piece, considered as a whole, is a round hole of such diameter as to fit the car-axle closely as possible without inviting friction. When the backliner or washer is made of wood the periphery of the circle is lined with sole-leather, rawhide, or felt, as see D D. To force the bisected backliner or washer to hug the axle continually, and as it shifts its position in the box by wearing away of the brasses, are two round or flat metal springs at each end of the bisected backliner or washer, considered as a whole, as see F F of the drawing. At E E are flat springs of metal, four in number, the purpose of which is to force the opposite side of the backliner or washer against the inside of the dust-chamber, and prevent the ingress of dust or other foreign substance, and the egress of grease, oil, or other lubricator.

A represents a car-box, with the automatic severed or bisected backliner or washer *in situ*. B is of wood, and closes the top of the dust-chamber, and against its inner surface play the springs on the upper end of the backliner or washer when it is in position. (See F F.)

Having thus fully described my invention, what I claim as new, and desire to secure by Letters Patent, is—

The combination, with a car-axle box, of the bisected backliner or washer C C, having upon one face the flat springs E E, and provided with the end springs F F, all substantially as and for the purposes herein set forth.

CHARLES H. BROWN.

Witnesses:
GEO. L. WESTMAN,
JOHN L. GRUBBS.